(12) United States Patent
Soh et al.

(10) Patent No.: US 8,699,098 B2
(45) Date of Patent: Apr. 15, 2014

(54) SCANNER GEAR ASSEMBLY

(75) Inventors: Phey Hong Soh, Singapore (SG); Kuek Peow Lai, Singapore (SG); Shyh Chije Leong, Singapore (SG); Lian Chye Simon Tan, Singapore (SG); Choon Hwee Yap, Singapore (SG); Boo Siong Lim, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 273 days.

(21) Appl. No.: 13/182,165

(22) Filed: Jul. 13, 2011

(65) Prior Publication Data

US 2013/0016403 A1     Jan. 17, 2013

(51) Int. Cl.
*H04N 1/04*     (2006.01)

(52) U.S. Cl.
USPC ........... 358/497; 358/474; 358/488; 399/361; 399/365; 399/370; 399/389

(58) Field of Classification Search
None
See application file for complete search history.

(56) References Cited

U.S. PATENT DOCUMENTS

| 5,465,163 | A | | 11/1995 | Yoshihara et al. | |
|---|---|---|---|---|---|
| 5,627,585 | A | * | 5/1997 | Goldschmidt et al. | 348/142 |
| 5,841,549 | A | * | 11/1998 | Munakata | 358/296 |
| 5,895,928 | A | | 4/1999 | Kerschner | |
| 5,991,662 | A | | 11/1999 | Kim et al. | |
| 6,002,492 | A | * | 12/1999 | Kamon et al. | 358/450 |
| 6,147,780 | A | | 11/2000 | Chiang | |
| 6,331,860 | B1 | | 12/2001 | Knox | |
| 6,507,415 | B1 | * | 1/2003 | Toyoda et al. | 358/450 |
| 6,636,335 | B1 | | 10/2003 | Tang et al. | |
| 6,690,482 | B1 | * | 2/2004 | Toyoda et al. | 358/1.2 |
| 6,694,065 | B2 | * | 2/2004 | Kobara et al. | 382/305 |
| 6,961,145 | B2 | * | 11/2005 | Smith | 358/1.2 |
| 6,975,434 | B1 | * | 12/2005 | Pilu et al. | 358/474 |
| 7,136,199 | B2 | * | 11/2006 | Cantwell | 358/474 |
| 7,333,250 | B2 | * | 2/2008 | Spears et al. | 358/497 |
| 7,426,064 | B2 | | 9/2008 | Cunnigan et al. | |

(Continued)

FOREIGN PATENT DOCUMENTS

| CN | 101867678 | 10/2010 |
|---|---|---|
| EP | 0509333 | 10/1992 |

(Continued)

OTHER PUBLICATIONS

Bai, Y-W. et al., Design and Implementation of a Scanner with Stitching of Multiple Image Capture, (Research Paper), IEEE Transaction on Consumer Electronics, Nov. 2008, pp. 1501-1505, vol. 54, No. 4.

(Continued)

*Primary Examiner* — Dung Tran

(57) ABSTRACT

A scanner comprises a first gear assembly on a frame, a stationary scan surface having a first width, and a scan module having a length substantially less than the first width. The scan module includes a second gear assembly configured to move the scan module, in a first orientation generally perpendicular to the first width, in a first scanning path relative to a first width portion of the scan surface and in a second, non-duplicative scanning path relative to a second width portion of the scan surface. The second gear assembly is releasably engageable to the first gear assembly to selectively shift the scan module, in a second orientation generally perpendicular to the first orientation, between the respective first and second scanning paths.

15 Claims, 7 Drawing Sheets

(56) References Cited

U.S. PATENT DOCUMENTS

| | | | |
|---|---|---|---|
| 7,529,001 B2* | 5/2009 | Takahara | 358/474 |
| 7,733,539 B2 | 6/2010 | Edwards et al. | |
| 8,223,408 B2* | 7/2012 | Lee et al. | 358/488 |
| 2002/0131092 A1* | 9/2002 | Tanaka et al. | 358/474 |
| 2003/0081267 A1* | 5/2003 | Cantwell | 358/474 |
| 2003/0141443 A1 | 7/2003 | Spears et al. | |
| 2004/0184118 A1 | 9/2004 | Sato | |
| 2008/0024836 A1* | 1/2008 | Sundnes | 358/474 |
| 2010/0149605 A1* | 6/2010 | Kim, II | 358/474 |
| 2010/0296130 A1* | 11/2010 | Lee et al. | 358/450 |
| 2012/0286170 A1 | 11/2012 | Van De Peut et al. | |

FOREIGN PATENT DOCUMENTS

| | | |
|---|---|---|
| KR | 20060134442 | 12/2006 |
| WO | WO-9207441 | 4/1992 |
| WO | WO-2012146358 | 11/2012 |

OTHER PUBLICATIONS

Scan-n-Stitch Deluxe, (Web Page), 1 Page, Retrieved from Web Oct. 30, 2013, http://www.arcsoft.com/estore/software_title.asp?productCode=SNSD.

* cited by examiner

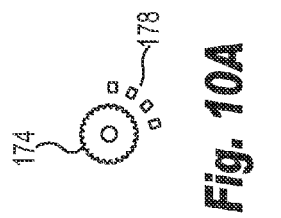
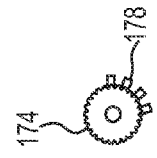
Fig. 10A
Fig. 10B
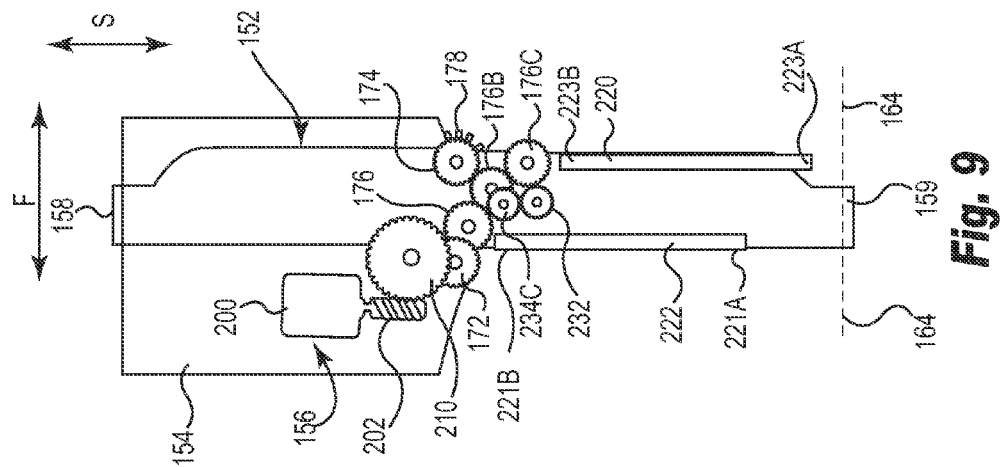
Fig. 9
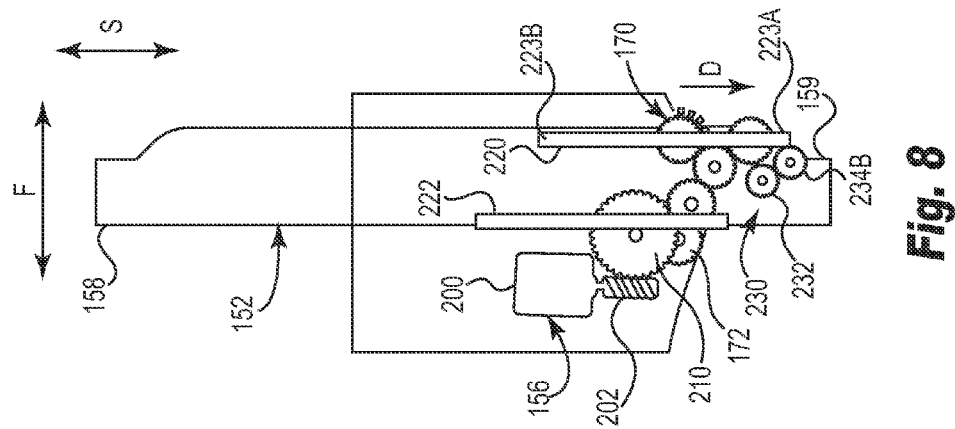
Fig. 8

SCANNER GEAR ASSEMBLY

BACKGROUND

Most conventional scanners include a standard size scanning element having a length adapted to perform a page-wide scan of a "US letter"-sized document or an A-sized document. Some other conventional scanners include a larger sized scanning element having a width adapted to perform a page-wide scan of larger width documents, such as B sized documents. Because of the high cost of the larger sized scanning elements and/or the infrequency with which oversized documents are scanned, standard sized scanners are more common than larger sized scanners. Accordingly, some conventional standard sized scanners provide alternate ways to scan larger sized documents. In one example, one portion of a document is scanned and then after repositioning the document, the remaining portion of the document is scanned. By using the overlap between the two scanned portions, the two scanned images are stitched together upon user interaction via software to produce a single, composite image of the larger sized document.

Unfortunately, these alternate ways of scanning oversized documents typically rely on a user performing the stitching operation and also typically include some user-based re-positioning of the document during the scanning operation.

BRIEF DESCRIPTION OF THE DRAWINGS

FIG. 8 is a top plan view schematically illustrating a scanning element of a scan module in a first position relative to a carriage element and a swing gear engaged with a first gear rail of the scanning element and with a gear train, according to an embodiment of the present disclosure.

FIG. 9 is a top plan view schematically illustrating a scanning element of a scan module in a second position relative to a carriage element and a swing gear disengaged from a first gear rail of the scanning element, according to an embodiment of the present disclosure.

FIGS. 10A and 10B are top plan views of a locking gear of a gear train in an unlocked position and a locked position, respectively, according to an embodiment of the present disclosure.

DETAILED DESCRIPTION

Figure 1A:
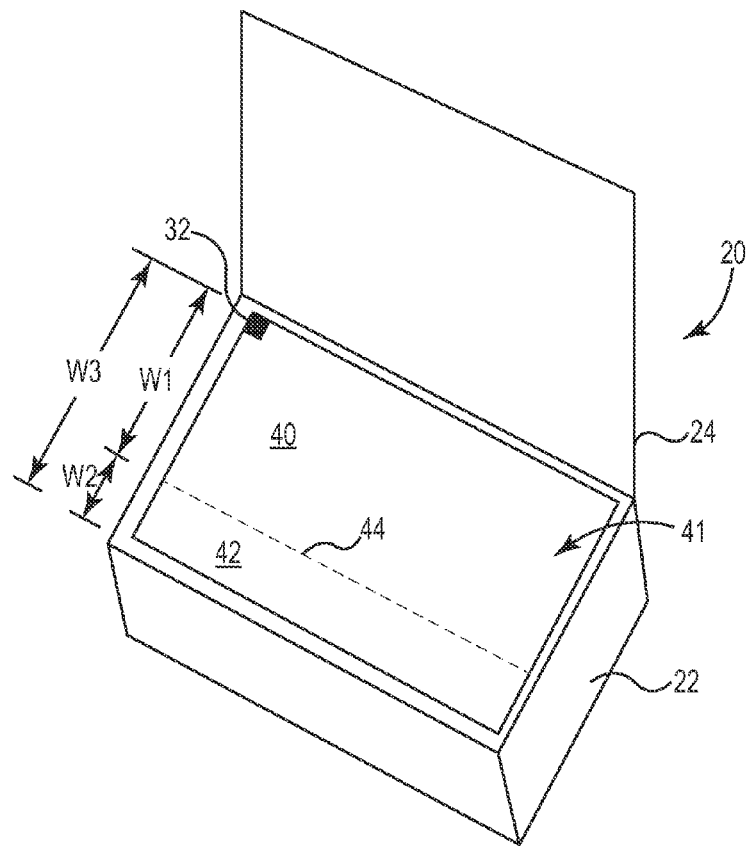
FIG. 1A is a perspective view schematically illustrating a scanner, according to an embodiment of the present disclosure.

In the following detailed description, reference is made to the accompanying drawings which form a part hereof, and in which is shown by way of illustration specific embodiments of the present disclosure that may be practiced. In this regard, directional terminology, such as "top," "bottom," "front," "back," "leading," "trailing," etc., is used with reference to the orientation of the Figure(s) being described. Because components of embodiments of the present disclosure can be positioned in a number of different orientations, the directional terminology is used for purposes of illustration and is in no way limiting. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

Embodiments of the present disclosure are directed a system and method for scanning larger sized documents using a standard size scanning element. In one embodiment, a scanner comprises a first gear assembly on a frame, a stationary scan surface having a first width, and a scan module having a length substantially less than the first width. The scan module includes a second gear assembly configured to move the scan module, in a first orientation generally perpendicular to the first width, in a first scanning path relative to a first width portion of the scan surface and in a second scanning path relative to a second width portion of the scan surface. The second gear assembly is releasably engageable to the first gear assembly to selectively shift the scan module, in a second orientation generally perpendicular to the first orientation, between the respective first and second scanning paths.

In one aspect, the images obtained from the two different scanning paths are automatically stitched together to produce a single, composite image corresponding to the larger-sized document or media residing on the scan surface. In one embodiment, this automatic stitching is performed via the scanner independent of an external computer.

In one embodiment, the second scanning path does not overlap with the first scanning path such that the first scanned portion and the second scanned portion do not include duplicative subject matter as part of their images. In one aspect, this lack of overlapping subject matter simplifies the automatic stitching together of the different first and second scanned portions. In other embodiments, the second scanning path does overlap with the first scanning path such that the first scanned portion and the second scanned portion include duplicative subject matter as part of their images, which is addressed during stitching.

In this arrangement, an oversized document or media such as a B-sized document is placed on a B-sized scan surface and then scanned with an A-sized scanning element without repositioning the document on the scan surface.

Moreover, because the media or document is not repositioned during scanning, the system is capable of automatically performing the stitching of the two scanned images rather than a conventional technique in which a user performs the stitching via software.

In one embodiment, a first width of the scan surface corresponds to a width of a B-sized document, such as about 11 inches and the length of the scanning element is about 8½ inches, which corresponds to the width of a standard size document (such as US Letter or A4). It will be understood that in other embodiments, a scan surface can have a different width and the scanning element can have a different length provided that the width of the scan surface is at least greater than the length of the scanning element. In one embodiment, as noted above, the width of the scan surface is substantially greater than the length of the scanning element.

These embodiments, and additional embodiments, are described and illustrated in association with FIGS. 1A-14.

FIG. 1A is a perspective view of a scanner 20, according to an embodiment of the present disclosure. As shown in FIG. 1A, scanner 20 includes a body 22 and lid 24 with body 22 supporting a stationary scan surface 41. In one aspect, marker 32 identifies a position at which a corner of each document is oriented. In another aspect, body 22 contains a movable scanning element as further described below in association with FIGS. 1B-14. As further shown in FIG. 1A, scan surface 41 includes a first portion 40 and second portion 42 (their border represented by dashed line 44), with the first portion 40 having a first width W1 and with the second portion 42 having a second width W2. In one aspect, first portion 40 of scan surface 41 represents a size of a standard document (e.g., a US letter or A-sized document) such that the first width W1 is about 8 to 8½ inches. Together, first portion 40 and second portion 42 define a third width (W3) represent an oversized or large sized document (e.g. a B sized document) having a width that is substantially greater than the first width (W1) of first portion 40.

It will be understood that the identification of the first portion 40 and the second portion 42 of scan surface 41 do not correspond to physically separate components, but rather first portion 40 designates the area occupied by a standard document and second portion 42 designates the additional width occupied by an oversized document. It will be further understood that in some embodiments, first portion 40 has a smaller width (than the standard page-wide width of 8½ inches) provided that a corresponding increased width in the second portion 42 does not exceed the length of the scanning element.

Figure 1B:
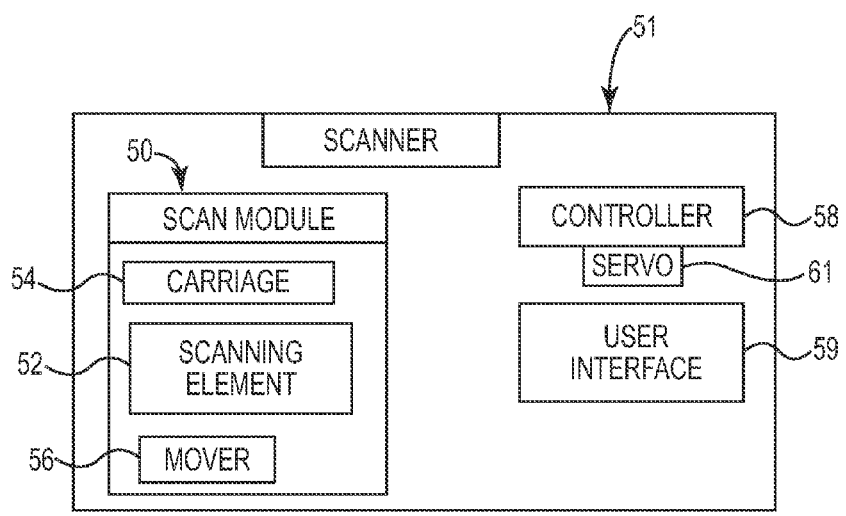
FIG. 1B is a block diagram of a scanner, according to an embodiment of the present disclosure.

FIG. 1B is a block diagram of a scanner 51, according to an embodiment of the present disclosure. The scanner 51 comprises at least substantially the same features and attributes as scanner 20 of FIG. 1A. As shown in FIG. 1B, scanner 51 includes scan module 50, controller 58, and user interface 59. The scan module 50 includes carriage 54, scanning element 52, and mover 56. The carriage 54 carries scanning element 52 and guides scanning element 52, in cooperation with mover 56, in scanning paths relative to a stationary scan surface (e.g. scan surface 30 in FIG. 1A). The mover 56 includes at least a motor and gear assembly associated with the carriage 54 and includes other gear assemblies provided throughout a frame of the scanner for selective engagement with the motor and gear assembly of the mover 56.

In general terms, the controller 58 provides signals to direct the actions and movements of scan module 50, and other components of scanner 51, to position scanning element 52 into the appropriate positions and along the appropriate paths to perform a scanning operation on a media residing on the scan surface 41. In one embodiment, controller 58 includes central processing units, application specific integrated circuits ASICs, microcontrollers, or other processing elements. In one aspect, controller 58 includes a memory storing software including instructions for performing the scanning operations described herein. Examples of the functions performed via controller 58, include but are not limited to, initiating, monitoring, and terminating scanning paths for scan module 50, positioning scan module 50 relative to the scan surface without scanning, and automatically stitching together two scanned images of different portions of a media (on stationary scan surface 41 in FIG. 1A) to produce a single composite image corresponding to the original media.

In another aspect, user interface 59 includes a graphical user interface or other user interface configured to initiate and manage, via controller 58, parameters of the scanning operation.

Figure 2:
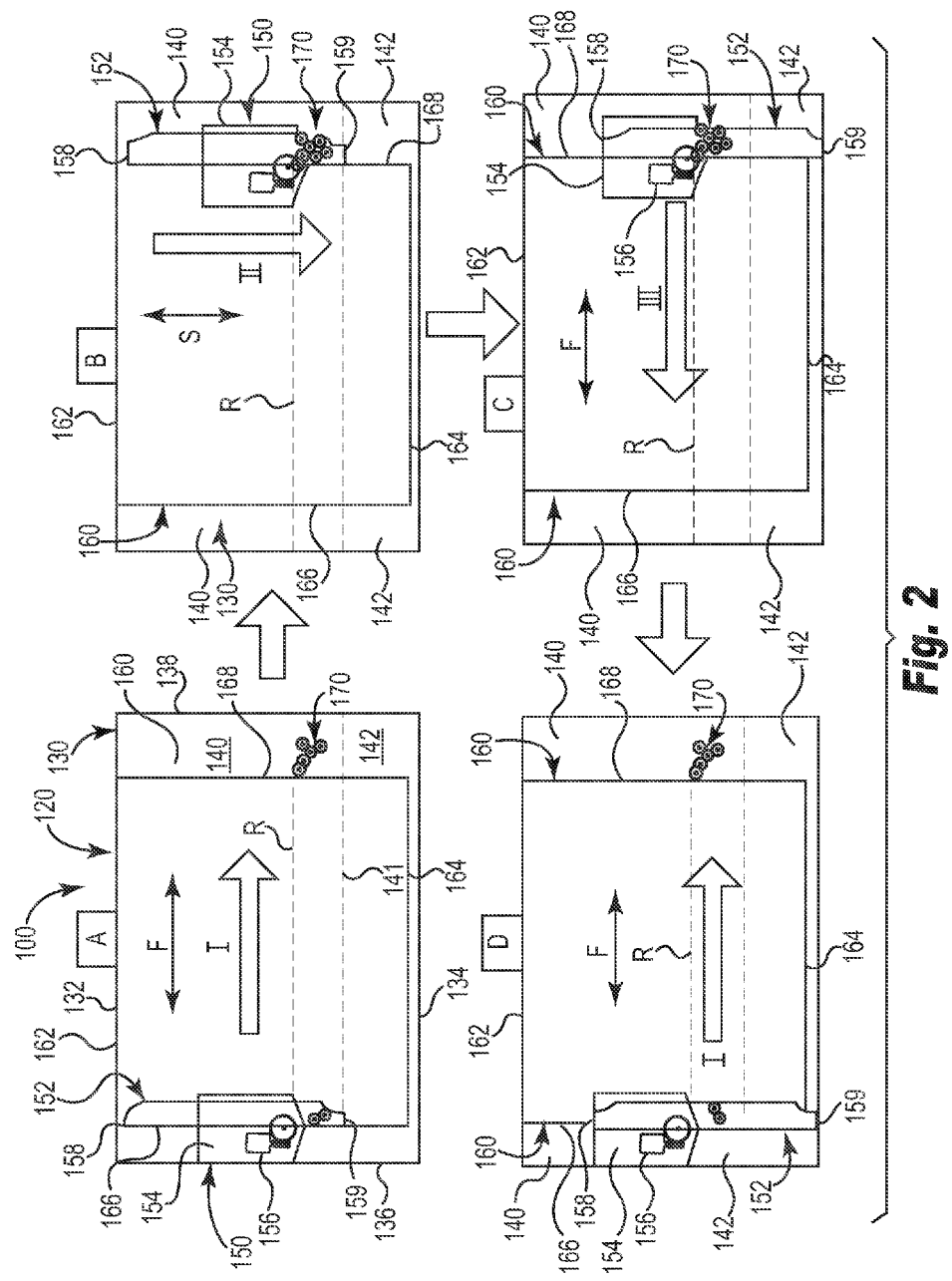
FIG. 2 is a diagram schematically illustrating a series of actions in a method and system of scanning, according to an embodiment of the present disclosure.
Figure 3:
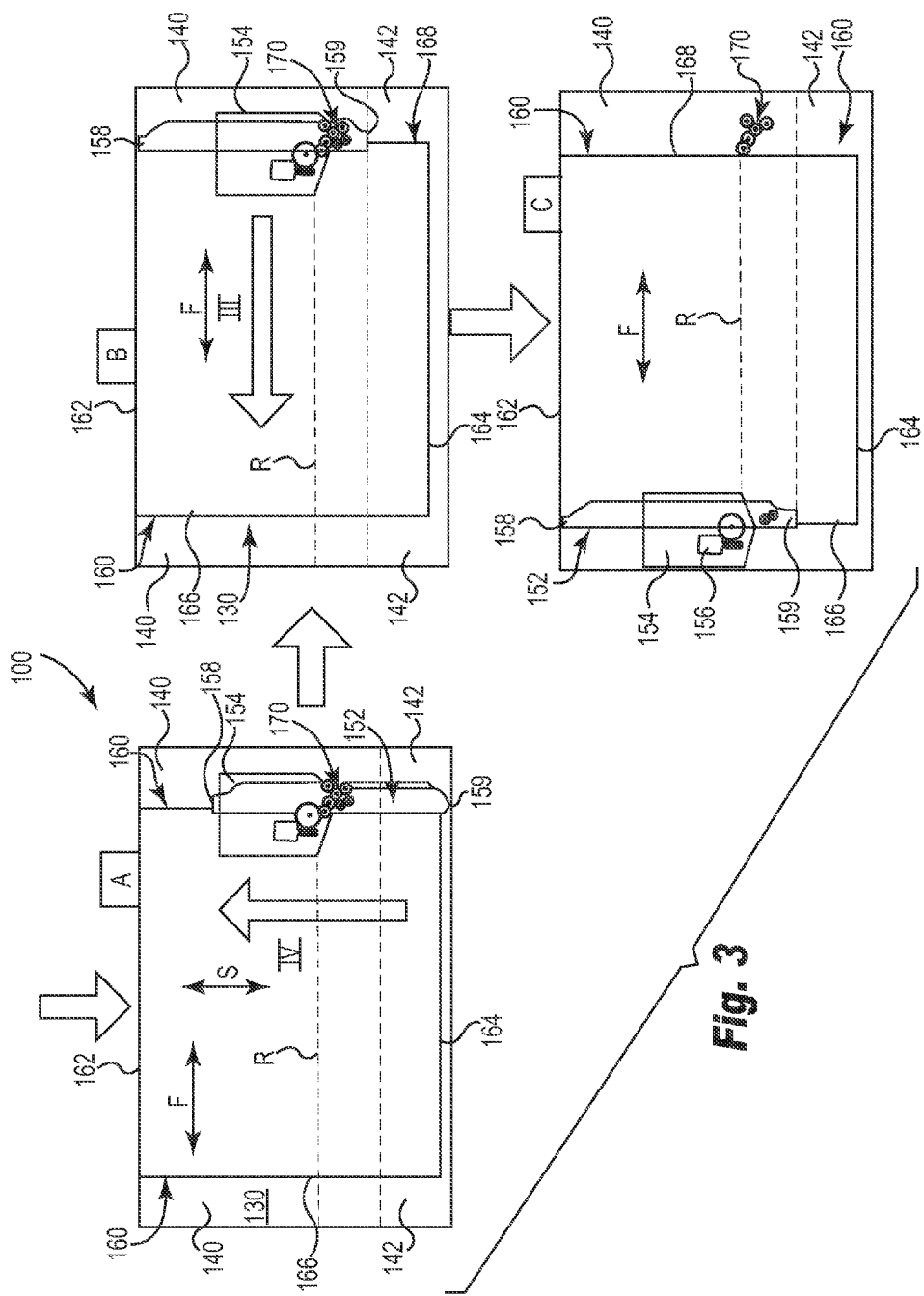
FIG. 3 is a diagram schematically illustrating a series of actions in a method and system of scanning, according to an embodiment of the present disclosure.

FIG. 2 is a diagram 100 schematically illustrating a series of actions (represented in windows A, B, C, D) in a system and method of scanning, in accordance with an embodiment of the present disclosure. In one embodiment, scanner 120 includes at least substantially the same features and attributes of scanner 20 of FIG. 1A and scanner 51 of FIG. 1B. As shown in FIG. 2(A), scanner 120 includes a scan frame 130 having a first side 132, second side 134, first end 136, and second end 138. A scan surface 160 is supported by frame 130 and includes a first side 162, second side 164, first end 166, and second end 168. The scan surface 160 is a generally transparent element and includes a first portion 140 and second portion 142, separated by dashed line 141. As noted above in association with FIG. 1A, first portion 140 has first width W1 generally corresponding to the width of a first sized document, such as a US Letter or A-sized document. The second portion 142 represents the extra width associated with oversized documents that have a width (W3 in FIG. 1A) corresponding to the combined width of the first and second portions 140, 142.

Of course, it will be understood that the principles of the present disclosure are applicable to scanning documents having a width greater than the width (W1 in FIG. 1A) of first portion 40 but less than the full width (W3 in FIG. 1A) of scan surface 160 between first and second sides 162, 164.

As further shown in FIG. 2(A), scanner 120 includes a scan module 150. It will be generally understood that the scan module 150 is located underneath the generally transparent scan surface 160 and, therefore, the scan module 150 is generally visible through the transparent scan surface 160. Accordingly, while some embodiments include opaque components arranged to support the transparent scan surface 160 in a vertically spaced position above the scan module 150, for illustrative purposes such opaque components are omitted from FIG. 2(A-D) and FIG. 3(A-C) to better illustrate the different positions of the scan module 150 relative to the scan surface 160.

Figure 4:
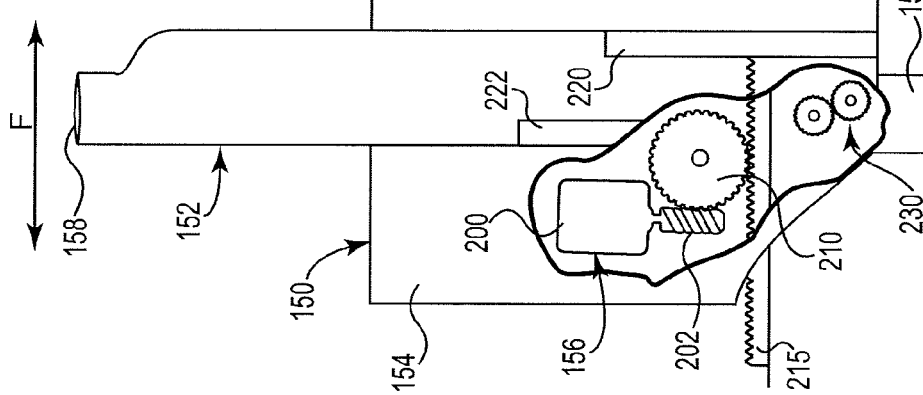
FIG. 4 is a top plan view, with partial exposed views, schematically illustrating a scan module including a motor and gear assembly, according to an embodiment of the present disclosure.

In one embodiment, as shown in FIG. 4, the scan module 150 includes a scanning element 152, carriage element 154, and a motor and gear assembly 156. The scanning element 152 includes a first end 158 and an opposite, second end 159. The scanning element 152 is mounted on the carriage element 154 and aligned so that a length of the scanning element 152 (extending between ends 158, 159) is aligned generally perpendicular to a first orientation (represented by bidirectional arrow F). In one aspect, as will be further illustrated and described in at least FIGS. 2(B)-2(C) and described below, the scanning element 152 is selectively slidable relative to the carriage element 154. In FIG. 2(A), scanning element 152 is shown in a first position in which the first end 158 is adjacent the first side 162 of scan surface 160 and the second end 159 is adjacent the line 141 that identifies the outer edge of first portion 142.

In one embodiment, as further shown in FIG. 4, the motor and gear assembly 156 includes a motor 200 having a rotary shaft 202 and a worm wheel 210. In one aspect, the motor and gear assembly 156 is configured to cause selective movement of scanning element 152 along the first orientation via worm wheel 210 (driven by motor 200) engaging a gear rail schematically represented via line R (such as gear rail 215 shown in FIG. 4) extending along the first orientation. In other embodiments, in place of a gear rail, the frame of the scanner 120 includes an elongate recess or trench to guide translation of the carriage element 154 in the first orientation in a manner familiar to those skilled in the art.

Equipped in this fashion, the scanning element 152 scans a media or document on scan surface 160 via selective movement of the scanning element 152 in a first direction (as represented by directional arrow I) along a length of a document along the first orientation (bidirectional arrow F) from first end 166 to second end 168 of scan surface 160. In other words, the scanning is performed in the first orientation generally perpendicular to the width (extending between first side 162 and second side 164) of scan surface 160. Upon completion of this movement, the scanning element 152 becomes positioned adjacent second end 168 of scan surface 160 as shown in FIG. 2(B) and a portion of a document or media corresponding to first portion 140 of scan surface 160 has been imaged as a first width portion of the media.

Prior to continuing with the description of the scanning operation, this present disclosure will further describe components of the scan module and the components with which it interacts during the scanning operation.

Figure 5:
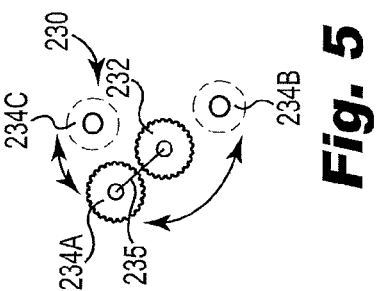
FIG. 5 is a top plan view schematically illustrating a swing gear assembly, according to an embodiment of the present disclosure.

In one embodiment, as illustrated in at least FIGS. 4-5, scan module 150 also includes a swing gear assembly 230 including an anchor gear 232 and a swing gear 234 that is movable into multiple positions via pivoting relative to anchor gear 232. As best seen in FIG. 5, swing gear 234 is pivotable into at least a first position 234A, a second position 234B, and a third position 234C. The swing gear 234 is connected to the anchor gear 232 via an arm 235 or other element that enables swing gear 234 to selectively pivot relative to anchor gear 232 upon initiation by controller 58 (FIG. 1B). In some embodiments, swing gear assembly 230 is considered to be a part of motor and gear assembly 156 while in other embodiments, swing gear assembly 230 is not part of motor and gear assembly 156.

In one embodiment, scanning module 150 includes a pair of gear rails 220, 222 mounted on the scanning element 152 and facing each other. In one aspect, the gear rails 220, 222 are generally parallel to a length of the scanning element 152, generally parallel to each other, and generally parallel to the entire width (extending between first side 162 and second side 164) of the scan surface 160. As later described in more detail in association with at least FIGS. 2(B), 3(A), and 8-14, swing gear 234 selectively engages the respective gear rails 220, 222 (one-at-a-time) to move scanning element 152 into the different illustrated positions relative to carriage element 154. Together, gear rails 220, 222 form a loop track against which swing gear 234 engages to move the scanning element 152 laterally back-and-forth across the full width of the scan surface 160.

Figure 6:
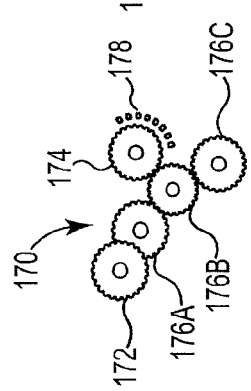
FIG. 6 is a top plan view schematically illustrating a gear train assembly, according to an embodiment of the present disclosure.

In another aspect, as further shown in FIGS. 2(A) and 6, scanner 120 includes a gear train assembly 170 located adjacent second end 168 of scan surface 160 with gear train assembly 170 being stationary and configured to releasably engage motor and gear assembly 156 of scan module 150. In one aspect, gear train assembly 170 is motorless as it relies on tapping power from motor and gear assembly 156 in order to drive other gears. While the gear train assembly 170 can include a variety of gears in different sizes and combinations, in one embodiment gear train assembly 170 as shown in FIG. 6 includes a combo gear 172, locking gear 174, and intermediate gears 176A, 176B, 176C. The combo gear 172 is positioned and configured to releasably engage worm wheel 210 (FIG. 4) to tap driving power from motor 200. The combo gear 172 transfers the power via intermediate gears 176A-176C to swing gear assembly 230, which in turn, drives gear rails 220, 222 (one-at-a-time) to thereby move scanning element 152 into different positions across the width of the scan surface 160.

In order to provide scanning of the second width portion of the media, generally corresponding to second portion 142 of scan surface 160, the scanning element 152 will be laterally shifted in the first direction (represented by arrow II in FIG. 2(B)) along the second orientation (represented by bidirectional arrow S) to a second position shown in FIG. 2C in which the second end 159 is adjacent the second side 164 of scan surface 160 and the first end 158 of scanning element 152 is located within first portion 142. In one embodiment, the scanning element 152 will travel about 3 inches to position at least a portion of the scanning element 152 to extend over the second portion 142. To cause lateral shifting of scanning element 152, motor and gear assembly 156 releasably engages gear train assembly 170.

Figure 7:
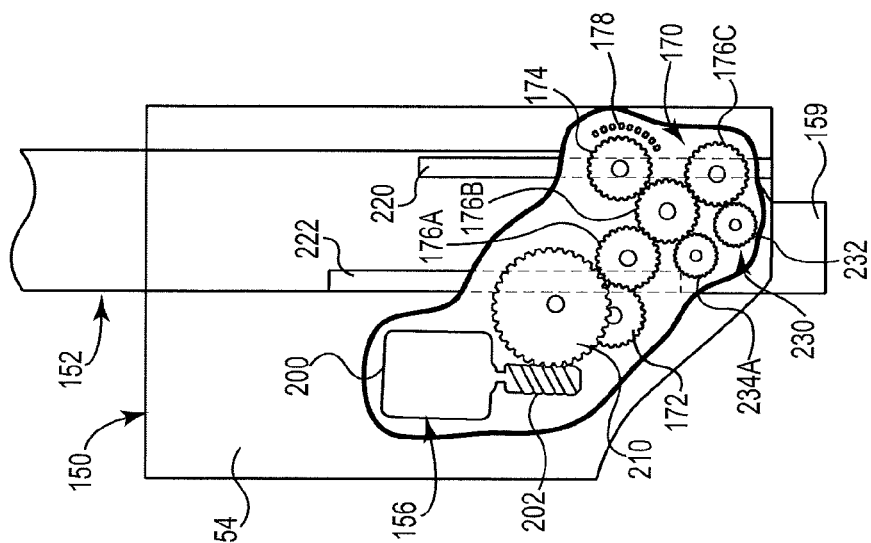
FIG. 7 is a top plan view, with partial exposed views, schematically illustrating a scan module including a motor and gear assembly during engaged with a gear train assembly, according to an embodiment of the present disclosure.

In particular, as shown in FIG. 7, upon the scanning element 152 arriving at second end 168 of scan surface 160, the motor and gear assembly 156 releasably engages the gear train assembly 170 so that power from motor 200 is transferred (via worm wheel 210 and combo gear 172) to gear train assembly 170. Next, swing gear assembly 230 is activated to pivot swing gear 234 relative to anchor gear 232 from its first position (234A in FIG. 5) to a second position (234B in FIG. 5) in which swing gear 234 releasably engages a first end 223A of first gear rail 220 of scanning element 152, as shown in FIG. 8. Upon such engagement, when driven via motor 200 and gear train assembly 170, swing gear 234 rotates to engage and drive first gear rail 220 and thereby cause translation (as represented by directional arrow D) of scanning element 152 relative to the carriage element 154 in the second orientation (S in FIG. 2(A)) which is generally perpendicular to the first orientation (arrow F). After completion of this movement, scanning element 152 arrives in the second position shown in FIG. 9 and FIG. 2(C) in which second end 159 of scanning element 152 becomes positioned adjacent second side 164 of scan surface 160.

After completion of this lateral shift of scanning element 152 in the second orientation, as best seen in FIG. 9, swing gear 234 disengages from second end 223B of first gear rail 220 via pivoting to its first position (234A in FIG. 5). Next, locking teeth 178 are activated to engage locking gear 174, which thereby locks gear train assembly 170 relative to frame 130, as shown in FIGS. 9 and 10B.

With gear train assembly 170 locked into a static position, motor and gear assembly 156 are freed to cause translation of scan module 150 (including carriage element 154 and scanning element 152) in the second direction (represented by arrow III) along the first orientation from second end 168 to first end 166 of scan surface 160. In this embodiment, no scanning occurs during this translation from second end 168 to first end 166 of scan surface 160.

Figure 11:
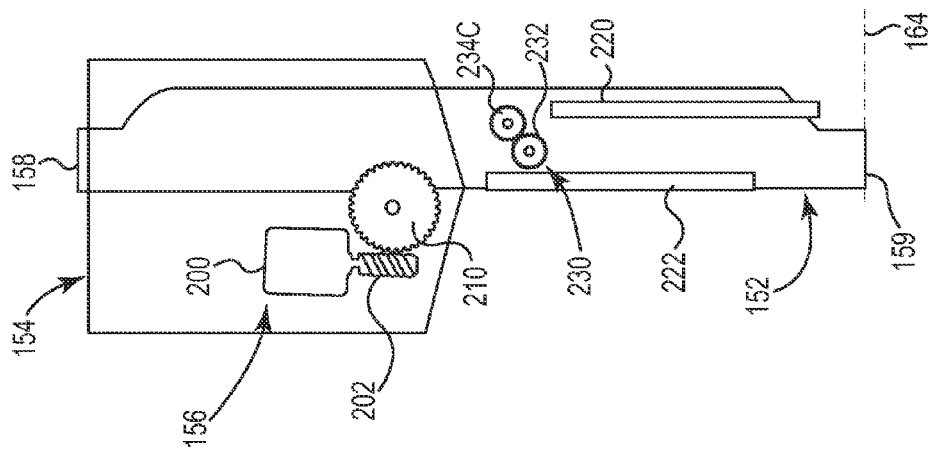
FIG. 11 is a top plan view schematically illustrating a scanning element of a scan module in a second position relative to the carriage element and a motor and gear assembly of the scan module disengaged from a gear train assembly, according to an embodiment of the present disclosure.

Upon completion of this translation, scan module 150 takes the position shown in FIG. 2D in which scanning element 152 is adjacent first end 166 of scan surface 160. In this position, as shown in FIG. 11, swing gear 234 is in a neutral position, and motor and gear assembly 156 are not engaged to gear train assembly 170, which remained adjacent the second end 168 of scan surface 160.

Starting from this position, a second scan is initiated while scan module 150 moves (as represented via directional arrow I) along the first orientation (F) from first end 166 to second end 168 of scan surface 160. With this action, scanning element 152 scans at least second portion 142 of scan surface 160. In one aspect, this second scanning path is non-duplicative in that it does not simply replicate the same scanning path as the first scanning path. At the completion of the scanning pass in the first orientation, scan module 150 arrives at second end 168 of scan surface 160 as shown in FIG. 3(A) with swing gear 234 in a neutral position.

In other embodiments, scanning is performed over portion 142 of scan surface 160 during movement of scanning element from the second end 168 to the first end 166 of scan surface 160 and then as scanning element 152 returns over portion 142 from the first end 166 to the second end 168, no scanning is performed.

Figure 12:
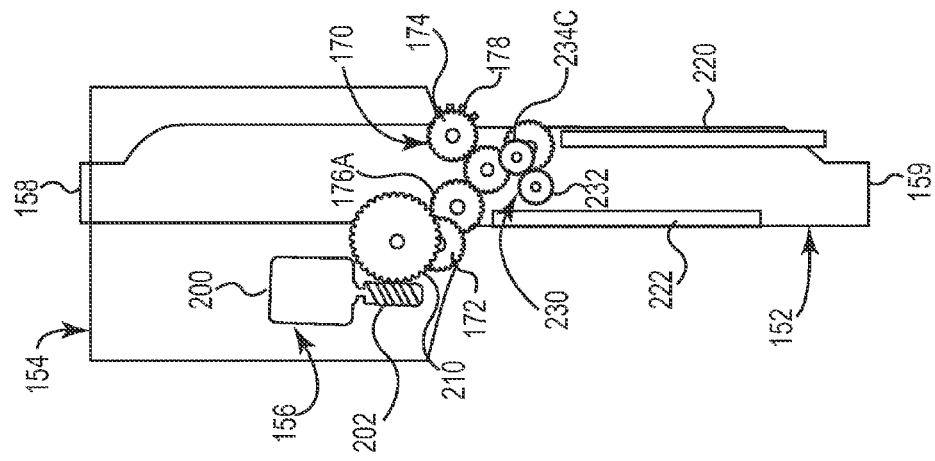
FIG. 12 is a top plan view schematically illustrating a scanning element of a scan module in a second position relative to a carriage element, and schematically illustrating a motor and gear assembly of the scan module engaged with a gear train of a frame, according to an embodiment of the present disclosure.
Figure 14:
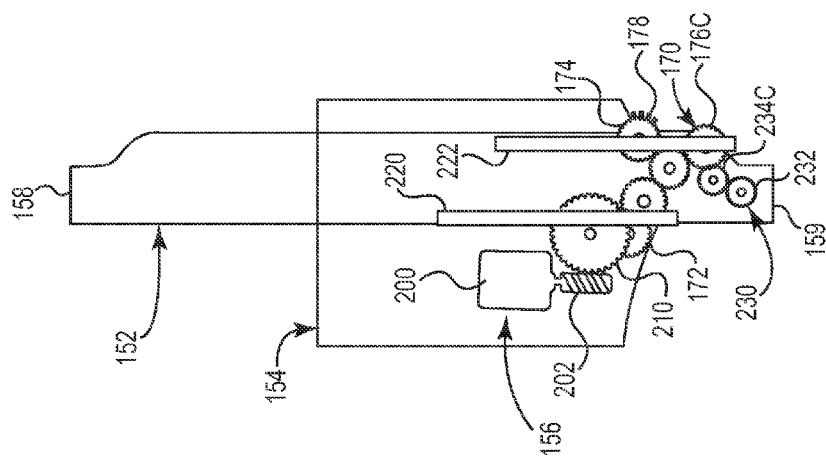
FIG. 14 is a top plan view schematically illustrating a scanning element of a scan module in a first position relative to a carriage element, and schematically illustrating a motor and gear assembly of the scan module engaged with a gear train assembly, according to an embodiment of the present disclosure.
Figure 13:
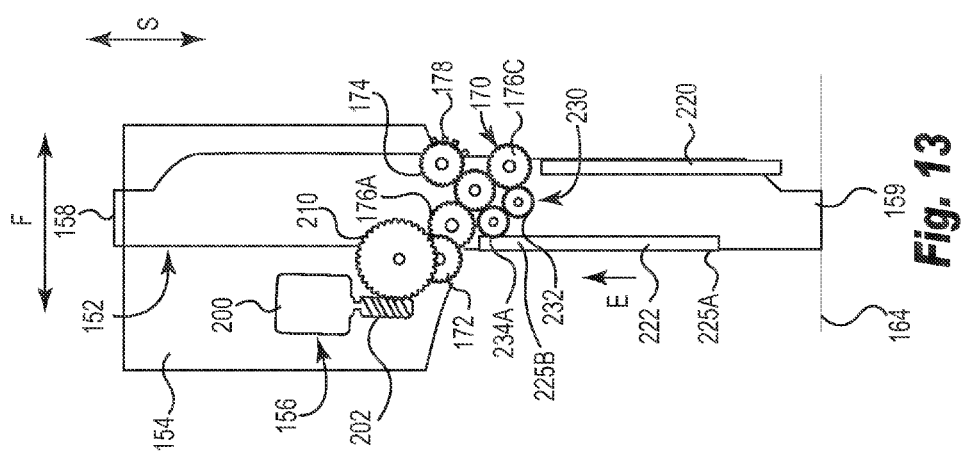
FIG. 13 is a top plan view schematically illustrating a scanning element of a scan module in a second position relative to a carriage element and a swing gear engaged with a second gear rail of the scanning element, according to an embodiment of the present disclosure.

When scanning element 152 and scan module 150 are in the position shown in FIG. 3(A) after completion of the second scanning path, motor and gear assembly 156 re-engages gear train assembly 170 in the manner described above in relation to FIG. 2(B) and FIGS. 7-8 but with swing gear 234 in a neutral position as further shown in FIG. 12. Next, the locking gear 174 becomes disengaged from locking element 178 in the manner shown in FIG. 10A, and swing gear 234 moves into engagement with first end 225A of second gear rail 222, as shown in FIG. 13. With second gear rail 222 so engaged, motor and gear assembly 156 drives swing gear 234 (via gear train assembly 170 as described above) to cause translation of second gear rail 222 (as represented by directional arrow E in FIG. 13) and of scanning element 152 (in a second direction IV in FIG. 3(A)) along the second orientation from second side 164 to first side 162 of scan surface 160. Upon completion of this action, scanning element 152 has been laterally shifted in the second orientation so that first end 158 of scanning element 152 becomes positioned adjacent first side 162 of scan surface 160 as shown in FIG. 3(B). In addition, upon completion of this action, swing gear 234 is disengaged relative to second gear rail 222, as shown in FIG. 14, and locking gear 174 engages locking element 178 (FIG. 10B) to secure gear train assembly 170 in a static position.

Next, as represented via directional arrow III in FIG. 3(B), scan module 150 is translated in a second direction along the first orientation without scanning from second end 168 to first end 166 of scan surface 160 until scan module 150 returns to its home position adjacent first end 166 of scan surface 160 and with first end 158 of scanning element 152 adjacent first side 162 of scan surface 160, as shown in FIG. 3C.

After this completion of the first and second scanning paths over first portion 140 and second portion 142, respectively, controller 59 (FIG. 1B) acts to automatically stitch together scanned images of the first and second portions 140, 142 to form a single composite image corresponding to the oversized media on scan surface 160.

In some embodiments, a width of the first width portion of a media (scanned in a first scanning path) and a width of the second width portion (scanned in a second scanning path) are generally equal to each other. For example, when the scanning element 152 moves through the first scanning path from the first end 166 to second end 168 of scan surface 160, just one-half of the entire width of scan surface 160 is scanned to form a first image portion. The second image portion is formed via the second scanning path covering the other one-half of the entire width of scan surface 160. The two image portions are automatically stitched together. In one aspect, this arrangement produces more efficient scanning as it reduces the amount of memory consumed and the total time used to scan, as compared to embodiments in which a first scanning path has a width corresponding to the entire length of the scanning element and the second scanning path has a substantially smaller width.

Embodiments of the present disclosure are directed to scanning a media using a scanning element having a length less than a width of the media being scanned. In one example, the length of the scanning element is substantially less than the width of the media and scan surface. This arrangement enables scanning documents or other media of a larger category by placing the media on a stationary scan surface, and scanning the media with a standard size scanning element by making multiple scanning passes without repositioning the media. The multiple scanning passes are non-duplicative in that different width portions of the media are scanned with each separate pass. The different scanned images are automatically stitched together to form a single composite image corresponding to the media on the stationary scan surface. Accordingly, this arrangement enables using a standard sized scanning element to scan a larger media without repositioning the media during the scanning operations and without the user having to perform the stitching operation. In some instances, this automatic scanning and automatic stitching is performed independent of an external computer.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this present disclosure be limited only by the claims and the equivalents thereof.

What is claimed is:

1. A scanner comprising:
   a first gear assembly on an end portion of a frame;
   a stationary scan surface having a first width;
   a scan module having a length substantially less than the first width and including:
      a second gear assembly configured to move the scan module, in a first orientation generally perpendicular to the first width, in a first scanning path relative to a first width portion of the scan surface and in a second, non-duplicative scanning path relative to a second width portion of the scan surface, wherein the second gear assembly is releasably engageable to the first gear assembly to selectively shift the scan module, in a second orientation generally perpendicular to the first orientation, between the respective first and second scanning paths.

2. The scanner of claim 1, comprising:
a controller configured to direct, independent of an external computer, automatic formation of a composite image from a first width portion of a media produced via the first scanning path and from a second width portion of a media produced via the second scanning path.

3. The scanner of claim 1, wherein the scan surface is sized and shaped to enable maintaining the media on the scan surface, without repositioning, between the first and second scanning paths.

4. The scanner of claim 1, wherein the second gear assembly comprises:
a motor;
a first gear rail and a second gear rail spaced apart from and generally parallel to each other, wherein the first and second gear rails are aligned generally parallel to the first width and to a length of the scan module; and
a swing gear selectively engageable relative to the first gear assembly of the frame and separately relative to the first and second gear rails, wherein when the swing gear is coupled to the motor via the first gear assembly, the swing gear is configured to be movable between at least:
a first position in which the swing gear engages the first gear rail to move the scan module in a first direction along the second orientation; and
a second position, the swing gear engages the second gear rail to move the scan module in a second direction opposite the first direction along the second orientation.

5. The scanner of claim 4, wherein the second gear assembly of the scan module comprises:
a third gear rail extending along a length of the frame in the first orientation; and
a worm wheel gear coupled to the motor and positioned to engage the third gear rail to move the scan module relative to the scan surface along the first orientation and positioned to selectively engage the first gear assembly.

6. The scanner of claim 4, comprising:
a locking mechanism positioned and configured to releasably engage a portion of the first gear assembly to releasably lock motion of the first gear assembly and release the scan module to move in the first orientation.

7. The scanner of claim 6, wherein the first gear assembly includes a locking gear and the locking mechanism includes a gear tooth element mounted on the frame and the locking gear configured to releasably engage, prior to movement of the scan module from a second end to a first end of the frame, the gear tooth element to enable disengagement of the second gear assembly from the first gear assembly.

8. A scanner comprising:
a frame including a first end portion and an opposite second end portion;
a motorless gear train mounted adjacent the second end portion of a frame;
a stationary scan surface having a first width and sized to receive and maintain a media without repositioning the media during scanning;
a scan module disposed vertically below the scan surface and including:
a scanning element having a length substantially less than the first width;
a scan carriage assembly supporting the scanning element and including a motor and a gear assembly coupled to the motor, the motor arranged to drive the gear assembly to move the scanning element, in a first orientation generally perpendicular to the first width, in a first scanning path relative to a first width portion of the scan surface and in a second, non-duplicative scanning path relative to a second width portion of the scan surface,
wherein the gear assembly is releasably engageable to the motorless gear train to selectively shift the scanning element, in a second orientation generally perpendicular to the first orientation, between the respective first and second scanning paths.

9. The scanner of claim 8, wherein the scanning element includes a first end and a second end, and wherein the frame includes a first side portion and an opposite second side portion,
wherein when the scan module moves in the first scanning path, the first end of the scanning element is positioned adjacent a first side portion of the scan surface,
wherein when the scanning module moves in the second scanning path, the second end of the scanning element is positioned adjacent a second side portion of the scan surface.

10. The scanner of claim 8, wherein the gear assembly includes a swing gear and the scan module includes a pair of gear rails extending generally parallel to a length of the scanning element, wherein the gear assembly is configured to releasably engage the motorless gear train to cause the swing gear to be moved into a first position to releasably engage and drive a first one of the gear rails to move the scanning element in a first direction generally parallel to the second orientation and to be moved into a second position to releasably engage and drive a second one of the gear rails to move the scanning element in an opposite second direction along the second orientation.

11. The scanner of claim 8, comprising:
a controller configured to cause formation of a composite image of the media via automatic stitching together a first image portion of the media, corresponding to the first width portion of the scan surface, and a second image portion of the media, corresponding to the second width portion of the scan surface.

12. A method of scanning comprising:
providing a stationary scan surface having a first width and configured to receive a media;
providing a scan module including a scanning element having a length substantially less than the first width; and
operating a motor and gear assembly of the scan module to automatically:
move the scanning element across a first width portion of the media, in a first orientation generally perpendicular to the first width, via engagement of the motor and gear assembly relative to a frame guide extending along the first orientation;
laterally shifting the scanning element, in a second orientation generally perpendicular to the first orientation, via engagement of the motor and gear assembly relative to a motorless gear train mounted on a frame; and
moving the scanning element across a second width portion of the media, in the first orientation, via engagement of the motor and gear assembly relative to the frame guide.

13. The method of claim 12, comprising:
automatically forming, via a controller, a composite image of the media via automatic stitching together a first image portion of the media, corresponding to the first width portion of the scan surface, and a second image portion of the media, corresponding to the second width portion of the scan surface.

14. The method of claim 12, wherein laterally shifting the scan module includes:
moving the scan module between:
- a first position in which a respective one of the first and second ends of the scanning element are adjacent a respective one of the first and second side portions of the frame; and
- a second position in which a respective other one of the first and second ends of the scanning element are adjacent a respective other one of the first and second side portions of the frame.

15. The method of claim 12, comprising:
returning the scan module to a home position, after completion of scanning the second width portion of the media, via:
- shifting the scan module, without scanning the media, laterally in the second orientation from the second side portion to the first side portion; and
- moving the scan module, without scanning the media, in the first orientation from the second end portion to the first end portion.

* * * * *